May 1, 1945.  F. E. LEIB ET AL  2,374,823
VIBRATION DAMPER FOR SUSPENDED WIRES AND CABLES
Filed June 15, 1942
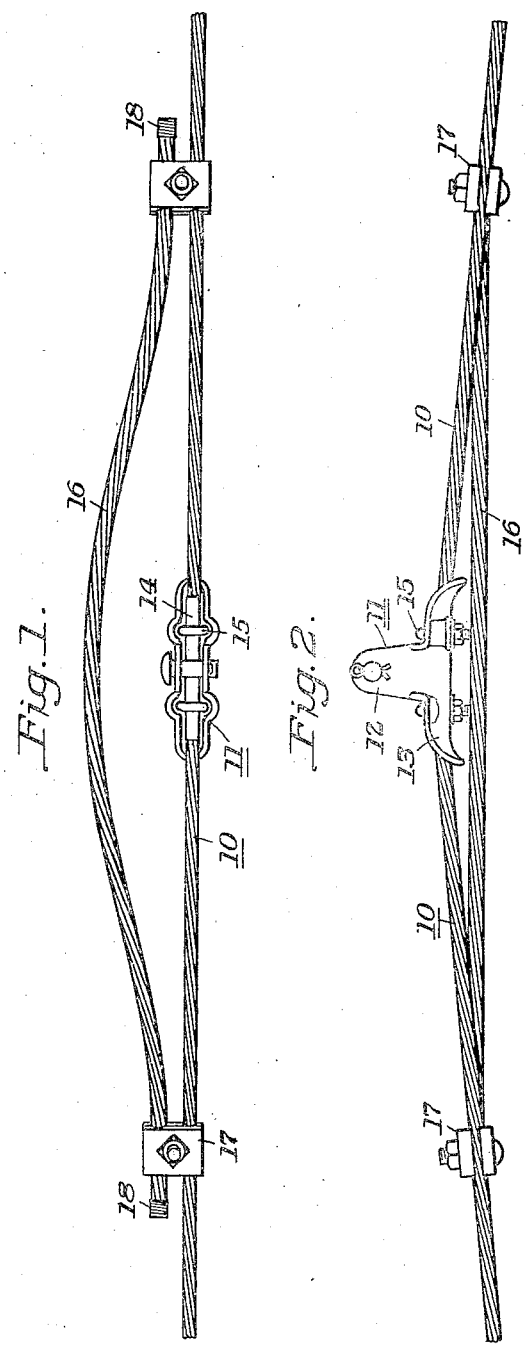
INVENTORS
*Francis E. Leib*
*Harold R. Wilbur*
by their attorneys
*Stebbins and Blenko*

Patented May 1, 1945

2,374,823

UNITED STATES PATENT OFFICE 2,374,823

VIBRATION DAMPER FOR SUSPENDED WIRES AND CABLES

Francis E. Leib, Jefferson, and Harold R. Wilbur, Reading, Pa., assignors to Copperweld Steel Company, Glassport, Pa., a corporation of Pennsylvania Application June 15, 1942, Serial No. 447,172

7 Claims. (Cl. 174—42)

This invention relates to vibration dampers and particularly to a damper suited for application to overhead electrical conductors.

Failure of overhead electrical conductors in fatigue, as a result of vibration, has become a serious problem in the maintenance of uninterrupted service in electrical distribution systems. It is now well known that steady winds of velocity below 25 miles per hour can induce practically continuous mechanical vibrations of moderate frequency in overhead conductors. These vibrations take the form of vibrating loops varying from about 6 to 30 feet in length. The vibrations subject the conductor to alternating bending stresses which may result in wire failure. In practice these failures occur usually in or adjacent to the supporting clamps. The motive force for the conductor vibrations is believed to be the formation of eddies in the air behind the conductor. These have a definite frequency depending on the velocity of the wind and the diameter of the conductor. The theory of conductor vibration assumes that when this eddy frequency coincides with a natural frequency or harmonic of the line, a resonance is established which initiates and maintains vibration. In a particular case other factors such as the elasticity of tower arms may be involved. A few field observations have been at variance with the calculated predictions, but the general theory has not been seriously challenged.

Attempts have been made to protect line conductors against the destructive effect of vibration by reinforcement or by attaching dampers to the line at appropriate points or both. The effect of a reinforcement is to strengthen the conductor adjacent the points of support by providing increased stiffness to resist the bending caused by vibration. Dampers have been applied to reduce the amplitude or the occurrence of vibrations and operate on the theory of energy absorption through a difference between the natural vibration frequency of the damper and the frequencies at which the suspended conductor is likely to vibrate. One form of damper comprises a concentrated weight suspended from the conductor. Another comprises a pair of spaced weights connected by a resilient member extending along the conductor and secured thereto at its mid point. Another expedient involves the application of a torsional stress to the conductor by attaching thereto a laterally projecting arm having a weight thereon. Another type of damper which has been proposed, i. e., the "festoon" type, comprises a length of conductor beneath the line conductor, extending for a considerable distance such as 30 or 40 feet on both sides of a point of suspension and clamped to the line conductor at a plurality of points spaced therealong. The damper conductor is so installed as to permit it to sag deeply between points of support, thus forming "festoons" from which the designation is derived. None of these various expedients, however, has provided a complete solution to the problem so far as we are aware, each having disadvantages as regards practical application or high cost.

We have invented a novel form of damper which is highly effective in reducing the severity of or entirely suppressing vibrations in an overhead-line conductor. In a preferred embodiment, the invention comprises a length of wire or cable which may conveniently be, though not necessarily, similar to that of which the conductor is composed. This length is secured to the conductor so that it extends generally parallel to and projects laterally from the line conductor. It may conveniently be installed adjacent points at which the conductor is suspended, on a suspension clamp for example, by attaching one end of the damper on each side of the support. At points where the conductor is secured to a deadend clamp, we prefer to employ a pair of attached lengths of cable disposed in staggered relation on opposite sides of the conductor. The character of the invention, its mode of application and the advantages thereof will become apparent during the following detailed description and explanation referring to the accompanying drawing for illustrations of the preferred embodiments.

In the drawing:

Figure 1 is a plan view showing a portion of a line conductor and a suspension clamp supporting it, with the damper of our invention attached thereto;

Figure 2 is a side elevation;

Figure 3 is a plan view showing the application of our damper to a conductor adjacent the point at which the latter is secured to a dead-end clamp; and Figure 4 is a partial side elevation of the arrangement shown in Figure 3.

Referring now in detail to the drawing, and for the present, to Figures 1 and 2, an overhead conductor 10 of solid or stranded type is suspended in the usual catenary, the weight of the conductor being supported at points spaced therealong by any suitable form of hanger such as a suspension clamp 11. Various forms of such clamps are well known and the exact type employed in any given installation is wholly immaterial to the invention. Such clamps usually comprise a clevis 12 adapted to be secured to a suspension insulator, with trough-shaped guides 13 extending laterally therefrom having a clamping bar 14 secured thereto by hook bolts 15. The guides 13 are designed to impart a smooth curve to the conductor at the point between adjacent loops, the conductor sagging downwardly on each side thereof as illustrated in Figure 2.

A vibration damper 16, according to our invention, takes the form of a length of cable or rod secured adjacent its ends to the conductor 10 by clamps 17 of any suitable type such as 1-bolt guy clamps. The length 16 is preferably bent somewhat in the shape of a bow and is secured to the conductor so that it extends laterally thereof. The cable length composing the damper may be a suitable length of the conductor itself although a cable of somewhat greater diameter seems preferable. As an example, a damper for $\frac{5}{16}''$ cable is somewhat more effective when formed from $\frac{3}{8}''$ cable than when composed of a piece of $\frac{5}{16}''$ cable. The length of the damper is of the order of several feet, e. g., three or four feet.

As shown in Figures 1 and 2, the damper of our invention, when applied to a conductor adjacent a point at which the latter is suspended, has one end thereof secured to the conductor on either side of the suspension clamp. The portion of the damper between the clamps 17 has considerable mass and a definite degree of resilience and can absorb energy in this way. Also since it extends laterally from the conductor, the conductor can absorb energy by the torsional stresses which the damper applies to the conductor. Since it is secured to the conductor on both sides of the point at which the latter is suspended, the damper also tends to cause interference between the vibrations of one catenary and the other. It will thus be apparent that our invention combines the energy absorption and damping features of several types of dampers previously proposed, i. e., the resiliently mounted weight, the torsional type and the "festoon" type, yet it has cost and constructional advantages over all these different types. Although we have illustrated the damper as composed of a length of stranded cable, it may be composed of a length of solid wire or rod. In case stranded cable is used, the ends of the damper are preferably bound by wrapping with small wire as indicated at 18 to prevent separation of the strands.

The portion of the damper 16 intermediate the clamps 17 by which it is supported, sags somewhat below the level of the conductor 10 as clearly shown in Figure 2, but lies substantially in the same horizontal plane as the adjacent portion of the conductor.

Our invention when applied as illustrated in Figures 1 and 2, has proved to be a highly effective damper or vibration suppressor. In fact, it prevented the initiation of resonant vibration, i. e., a standing wave, when applied to a catenary of line conductor, even under a strong force tending to set up vibrations. Similarly, it prevented the setting up of a travelling wave along the length of the suspended conductor span. An accelerated comparative test between a span having the invention applied thereto and one not so provided, resulted in failure of the undamped span in fatigue after three hours but no failure of the span provided with our invention was obtained after several days of subjection to similar forces tending to set up vibrations. In the latter case it was not possible to initiate resonant vibration of appreciable amplitude.

Figures 3 and 4 illustrate the application of the invention to a line conductor adjacent the points where it is secured to a strain or dead-end clamp. Such a clamp is illustrated at 20. This type of clamp, of course, is employed where the tension in the catenary is not balanced by a like tension in an adjoining catenary. Various types of strain clamps are available and any convenient type may be employed. The clamp illustrated at 20 comprises a guide 21 curving away from the line of the conductor illustrated at 22 and having a clevis 23 adapted to be secured to a strain insulator. A clamping bar 24 engaged by hook bolts 25 secures the conductor to the clamp. A pair of dampers 16 are applied to the conductor 22 adjacent the clamp 20, one damper extending laterally on each side of the conductor, the two dampers being staggered along the conductor so that the end of one damper lies substantially opposite the mid-portion of the other. The dampers are secured to the conductor 22 by clamps 17, as in the installation shown in Figures 1 and 2.

The damper of our invention is substantially as effective when applied as shown in Figures 3 and 4 adjacent a dead-end clamp as when applied in the manner shown in Figures 1 and 2 adjacent a suspension clamp. This is an important advantage since it is unnecessary to provide different types of dampers for installation at different points along the conductor. It will be apparent that the invention is characterized by numerous additional advantages. It is simple, not expensive, and easy of application. Its effectiveness in reducing the amplitude or entirely suppressing vibrations has already been explained. In short, the invention appears to combine the effects of various types of dampers known heretofore, to suppress vibrations more effectively than any of the former types, and to avoid their disadvantages of high cost or difficult installation characteristics.

The damper may be made up of pieces cut from scrap lengths of cable, each damper requiring, in addition, only a pair of standard inexpensive clamps. A further advantage is that the damper is applied only adjacent points of support which are usually easily accessible to linemen.

Although we have illustrated and described but two preferred embodiments of the invention, it will be recognized that changes in the form of the damper of our invention and the manner of attachment to the line conductor may be varied without departing from the spirit of the invention or the scope of the appended claims.

We claim:

1. A vibration damper for a suspended conductor cable comprising a piece of cable having a length of the order of several feet, disposed alongside the conductor cable with its ends substantially parallel to the latter and secured thereto, the portion of the attached cable intermediate its ends bowing outwardly from the conductor cable on a smooth curve in substantially the same horizontal plane as the conductor and being supported only by the attachment of the ends thereof.

2. A vibration damper for a suspended conductor comprising an elongated metal member having a length of the order of several feet and a diameter of about the same order as that of the suspended conductor, said member being somewhat bow-shaped, disposed substantially in the same horizontal plane as the conductor and secured adjacent its ends to said conductor in the neighborhood of a point of support, said member being free from all support intermediate the points at which it is secured to the suspended conductor.

3. A vibration damper for a suspended conductor comprising a short length of cable somewhat bow-shaped, disposed substantially in the same horizontal plane as the conductor and being secured thereto adjacent its ends in the neighborhood of a point at which the conductor is supported, and floating free of supports at all points intermediate said ends.

4. A vibration damper for a transmission-line conductor comprising a short length of conductor generally similar to that of which the line is constructed, said length being somewhat bow-shaped, secured at its ends only to the line conductor adjacent a point of support therefor and disposed in substantially the same horizontal plane therewith, said length being supported exclusively by its ends.

5. A vibration damper for a transmission-line conductor comprising a short length of cable secured at its ends to said conductor and bowing laterally therefrom intermediate said ends in substantially the same horizontal plane with the conductor, the bowed portion of said length floating freely between its ends.

6. A vibration damper for a suspended overhead-line conductor comprising a short length of cable having its ends secured to the conductor on opposite sides of a suspension support, and bowing outwardly from the conductor intermediate said ends, in substantially the same horizontal plane as the conductor.

7. Damping means for a suspended conductor, comprising a pair of lengths of cable secured at their ends only to the conductor adjacent a support therefor, said lengths being disposed substantially in the same horizontal plane with the conductor and on opposite sides of the latter, the intermediate portions of the cables floating free of supports.

FRANCIS E. LEIB.
HAROLD R. WILBUR.